(No Model.)
F. B. HILLER.
IMPLEMENT FOR PLANTING CRANBERRY VINES.
No. 323,419. Patented Aug. 4, 1885.
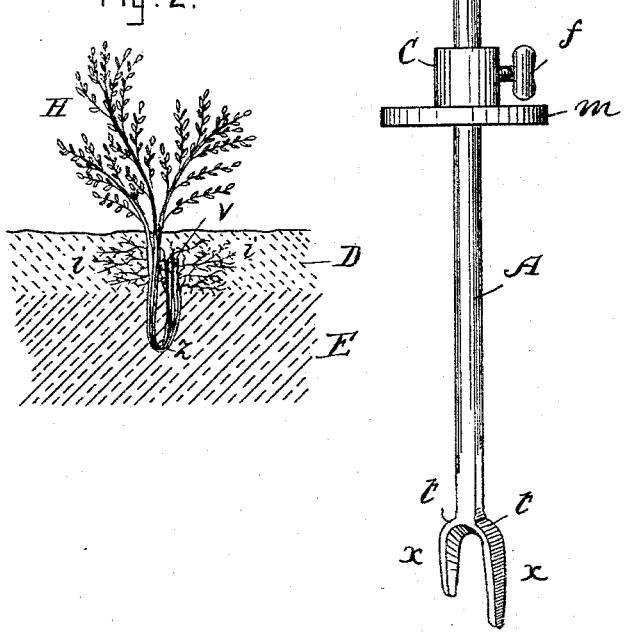
Witnesses.
E. Planta.
L. J. White.
Inventor.
Francis B. Hiller,
Per C. C. Shaw,
Attorney.

UNITED STATES PATENT OFFICE.

FRANCE B. HILLER, OF WILMINGTON, MASSACHUSETTS.

IMPLEMENT FOR PLANTING CRANBERRY-VINES.

SPECIFICATION forming part of Letters Patent No. 323,419, dated August 4, 1885.

Application filed June 18, 1885. (No model.)

*To all whom it may concern:*

Be it known that I, FRANCE B. HILLER, of Wilmington, in the county of Middlesex, State of Massachusetts, have invented a certain new and useful Improvement in Implements for Planting Cranberry-Vines, of which the following is a description sufficiently full, clear, and exact to enable any person skilled in the art or science to which said invention appertains to make and use the same, reference being had to the accompanying drawings, forming part of this specification, in which—

Figure 1 is a side elevation of my improved implement, and Fig. 2 a diagram showing the method of planting the vines.

It is well known that in the cultivation of cranberries the meadow or bog is prepared for the reception of the vines by covering the muck or mud of which it is composed with a layer or coating of sand, usually averaging from three to four inches in depth, the vines being planted in hills or rows, as desired, and in such a manner that their lower ends or roots proper are below the sand and embedded in the mud. It is, however, very important in planting the vines that the mud which underlies the sand should not be brought to the surface, mixed with the superposed sand and packed around the vines in the process of planting, as when this is done it causes the meadow to become infested with weeds, thereby rendering frequent weeding necessary and greatly increasing the cost of cultivation. Another objection to bringing the mud to the surface in the process of planting and packing or tamping it around the vines, as described, arises from the fact that when the mud is thus exposed it is more easily affected by cold or frosts than the sand, and is liable to crack and heave the vines out of position before the meadow can be flowed with water, thereby frequently necessitating replanting a part or the whole of the meadow, and causing great loss of time and property. It is, however, very difficult to plant the vines by the use of the ordinary transplanting trowel, or by means of a hoe, shovel, or spade without bringing more or less of the mud to the surface, thereby producing the undesirable result set forth.

My invention is designed to obviate these objections; and to that end I make use of means which will be readily understood by all conversant with such matters from the following explanation, the extreme simplicity of the improvement rendering an elaborate description unnecessary.

In the drawings, A represents the body, and B the handle, of the implement. The body is preferably composed of iron or steel, and may be of any suitable length and diameter, its lower end being bifurcated or provided with the duplex prongs $x\ x$, and the handle attached at right angles to the body at its upper end.

A sleeve, C, having an annular horizontally-projecting flange, $m$, is fitted to slide on the body A, said sleeve being provided with a set-screw, $f$, for securing it in any desired position, the flanged sleeve serving as a gage or stop to determine the depth to which the implement shall enter the ground.

In Fig. 2, D represents the sand, E the mud, and H a bunch of the vines after having been planted by the implement shown in Fig. 1.

In the use of my improvement the gage is adjusted in proper position on the body A by the screw $f$, and the handle B grasped in one hand. The vines H are then taken in the other hand and the forks or prongs $x\ x$ placed astride them at $z$, or a few inches from the ends of the roots proper, and the vines then forced down through the sand into the mud by pressing on the handle B, after which the implement is carefully withdrawn, leaving the vines planted and the sand and mud substantially undisturbed. As the implement passes downwardly through the sand D into the mud E the vines will be doubled up, as shown at $z$, the central portion of the bodies of the vines being forced into the mud, and their roots proper, $v$, left mostly in the layer of sand, thus not only supporting the vines more firmly in the ground than when they are planted in the usual manner, but enabling them to take root and grow with much greater rapidity.

The vines receive the larger part of their nourishment from the nutritious portions of the mud after the same has been taken up or absorbed by the sand, and hence they send out their rootlets or fine roots in the greatest numbers in the sand to extract the nutriment therefrom, the rootlets growing both from the bodies and roots proper of the vines, as shown at

*ii*, at the points where the same are embedded in the sand; but when the vines are planted in the ordinary manner and the roots proper are left in the sand the planting will necessarily be so shallow that the vines for the first year or two are liable to be weakly, owing to not having sufficient nourishment and the air gaining access to the roots, which often destroy them; but by the use of my improved implement the soil and mud are so firmly packed around them that the air is completely excluded, and they at once receive sufficient nourishment to enable them to take root, start, and throw out runners from one to three feet long, even when planted in September.

When the vines are planted shallow to give them a large surface-contact with the sand, they necessarily have to be planted early in the season in order that they may become thoroughly rooted before the meadow is flooded in the fall; but when planted with my improved implement, as described, they are so firmly embedded in the ground that the meadow may be flooded immediately thereafter, if desired, thus enabling the vines to be planted very late in the season, and not only get a good start before the meadow is flooded, but to be in readiness to commence growing as soon as the water is drawn off in the spring, thereby gaining much valuable time in rearing the vines.

The ordinary process of setting out the vines being very laborious, they are usually placed in hills or bunches about three feet apart, the time required to plant a hill being about three minutes, whereas by means of my improved implement the vines may be readily set in continuous rows at the rate of about fifteen or twenty bunches a minute, thus saving largely in the time required to do the work, and enabling it to be done in a far more satisfactory manner than it can be accomplished by means of a trowel, hoe, or shovel.

The body A is preferably made about eighteen inches in length, and very slender, but must have sufficient rigidity to enable it to pierce the ground and force the vines through the sand into the mud, as described.

I do not confine myself to constructing the sleeve C precisely as described, as any suitable device adapted to perform the functions of a gage or stop may be employed, instead of said sleeve. Neither do I confine myself to attaching the handle B to the upper end of the body, or constructing it as shown, as any suitable handle may be employed, or the handle may be omitted, if desired. Three prongs, *x*, may also be employed, instead of two, if desired; but I prefer to use but two, and to have them very short, as shown, or just long enough to properly straddle the vines. The upper ends of the prongs, where they join the body A, should also be curved or rounded, as shown at *t*, to enable the implement to be withdrawn from the ground and disturb it as little as possible.

It will be obvious that the implement is well adapted for planting vines and plants of various kinds, and I do not therefore limit myself to using it for planting cranberry-vines only.

As I propose to make the process of planting or setting out cranberry-vines as herein described the subject-matter of other Letters Patent, I do not claim the same in this application; but Having thus explained my invention, what I claim is—

1. In an implement for planting cranberry and other vines, the combination of the following instrumentalities, to wit: a long slender body adapted to enter and be withdrawn from the ground without greatly disturbing it, said body being provided with two short prongs at the lower end of said body adapted to pass astride the vines, and with a handle at or near its upper end for forcing the implement into the ground, substantially as described.

2. In an implement for planting cranberry and other vines, the combination of the following instrumentalities, to wit: a long slender body adapted to enter and be withdrawn from the ground without greatly disturbing it, two short prongs at the lower end of said body adapted to pass astride the vines, a handle at or near the upper end of the body for forcing the implement into the ground, and a gage or stop to prevent it from entering the ground too far, substantially as set forth.

3. The improved implement herein described, the same consisting of the body A, provided with the handle B, and having the prongs *x x*, and the sleeve C, provided with the screw *f*, constructed, combined, and arranged to operate substantially as described.

FRANCE B. HILLER.

Witnesses:
C. A. SHAW,
L. J. WHITE.